3,335,277
METHOD FOR GAMMA COMPENSATING AN IONIZATION TYPE NEUTRON DETECTOR
Paul Schmid, Effingen, Aargau, Angelo Comunetti, Binningen, Basel-Land, and Theodor Hürlimann, Wurenlingen, Aargau, Switzerland, assignors to Gesellschaft zur Förderung der Forschung an der Eidgenossichen Technischen Hochschule, Zurich, Switzerland, an association
Filed Feb. 17, 1964, Ser. No. 345,221
Claims priority, application Switzerland, Mar. 1, 1963, 2,690/63
6 Claims. (Cl. 250—83.1)

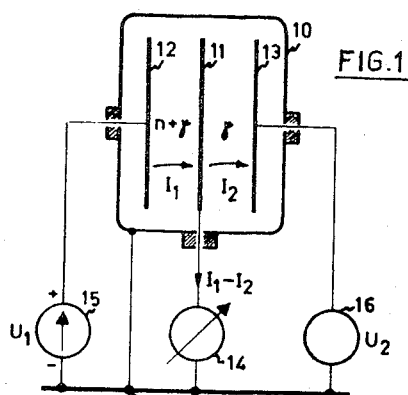
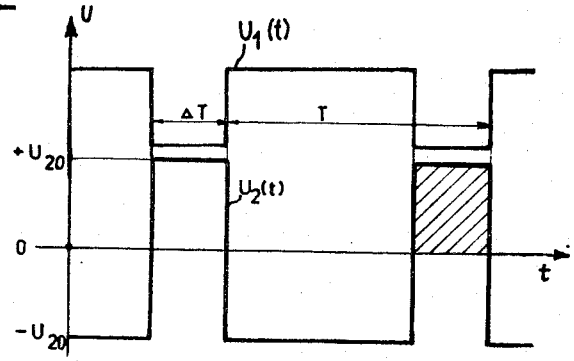
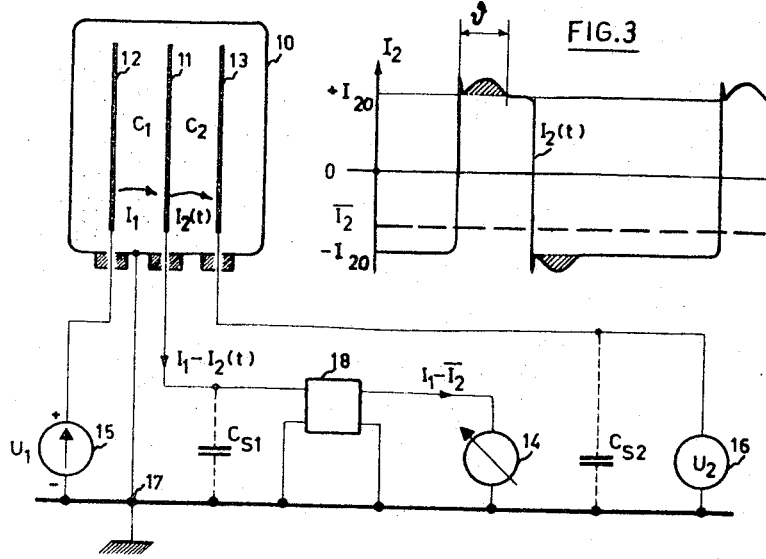
INVENTORS:
Paul Schmid
Angelo Comunetti &
Theodor Hürlimann
BY  Werner W. Kleeman
    Their Attorney United States Patent Office 3,335,277
Patented Aug. 8, 1967

The present invention relates to an improved method for the γ-compensation of an ionization chamber measuring a flux of neutrons, particularly in a nuclear reactor.

As is already known to the art, an ionization chamber suitable for the purposes of the present invention incorporates at least one measuring electrode and at least two polarization electrodes, one of which serves as compensation electrode. A current measuring device is coupled to the measuring electrode and the potential reference point. Two voltage sources connected to the polarization electrodes and the reference point respectively, provide the polarization potentials. The voltage source connected to the compensation electrode is designated as the compensation voltage source.

Ionization chambers of this type are well known to the art. The principle of gamma-compensation is explained in detail in the United States Patent 2,440,167, granted on April 20, 1948 and invented by J. W. Broxon and William P. Jesse. In the Broxon ion chamber the quality of the γ-compensation depends mainly on the ratio of the volumes of the (n+γ) and the γ-compartments. However, there are no means provided for fine setting or adjustment of the γ-compensation.

The method of the invention enables fine setting of the γ-compensation. It can be applied to the Broxon chamber for example, if it is manufactured as an overcompensated chamber, as will be explained in detail.

The need for fine adjustment results from the properties of the γ-field in a nuclear reactor. This γ-field is not homogeneous, the spectrum and the field gradient of the ionization density change with history and operating conditions of the reactor. Therefore it is necessary to readjust the γ-compensation from time to time.

For this purpose ionization chambers with a mechanically adjustable compensation volume have already been constructed. However, they have the disadvantage of being relatively complicated and expensive.

Two methods are already known to the art which permit electrical setting of compensation:

(1) One method makes use of the saturation characteristic of an ionization chamber. It can only be applied to geometrically slightly overcompensated chambers. Because the saturation characteristic is largely dependent upon the ionization density, this method allows correct γ-compensation for a given, invariable γ-yield only. To make the compensation quality independent of the ionization density, both polarization voltages must be above the saturation limit.

(2) Another method, as taught in German patent publication 1,049,982, of Feb. 5, 1959, uses a bridge circuit that permits adjustment of the compensation by setting the value of a variable resistance. This method allows both polarization voltages to be kept above the saturation limit. Nevertheless, it requires a particularly designed ionization chamber with at least two measuring electrodes and two measuring leads instead of one.

Accordingly, it is a primary object to provide for electrical compensation which overcomes the aforementioned difficulties.

Another more specific object of the present invention to provide an improved method for the γ-compensation of an ionization chamber which overcomes these previously noted disadvantages.

The method of the present invention consists in the use of a particular compensation voltage source with a voltage above the saturation limit, the polarity of which is periodically reversed, so that a fraction of the compensation current is reversed to the measuring electrode. This method is applicable with most types of the commonly used ionization chambers if they are geometrically overcompensated. Gamma-compensation is achieved by adjusting the ratio between the time interval ΔT of polarity reversal to the period T of the reversals, i.e. ΔT/T. Advantageously, provision is made to ensure that the duration ΔT of each reversal is kept longer than the time of flight of the ions, and that it amounts to approximately 10 to 40% of the duration of the period.

Other details of the invention will become apparent by reference to the following description and accompanying drawings, given by way of example only.

In the drawings:

FIGURE 1 schematically illustrates a conventional arrangement for γ-compensation of an ionization chamber, in the manner as such is also employed for the performance of the inventive method;

FIGURE 2 graphically depicts the ideal shape or curve with respect to time of the compensation potential used with the method of the invention;

FIGURE 3 illustrates the time dependence of the resulting compensation current if the charge carriers are electrons and uniform positive ions only;

FIGURE 4 shows an equivalent electric circuit diagram of the arrangement of FIGURE 1;

Figure 5:
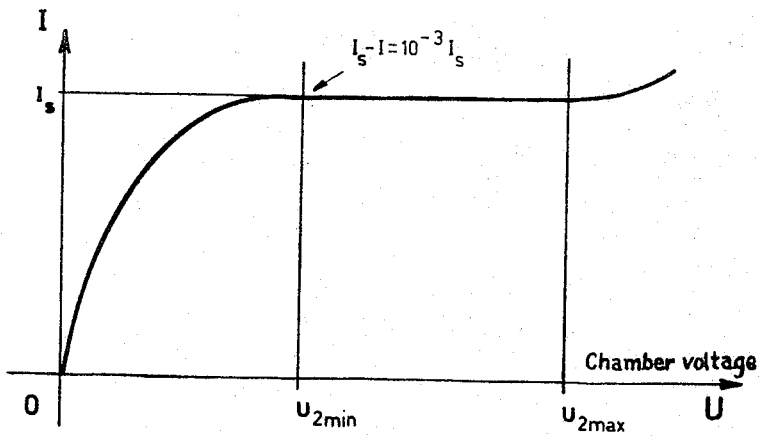
FIGURE 5 illustrates in graph form the current-voltage characteristics of an ionization chamber for the case of constant ionization.

Describing now the drawings, the ionization chamber 10 depicted in FIGURE 1 contains three electrodes 11, 12 and 13 insulated from one another, namely a measuring electrode 11 and two polarization electrodes 12 and 13, the latter of which serves as compensation electrode. The ionization chamber 10 is filled with a suitable gas, hydrogen for example. The faces of the measuring electrode 11 and the polarization electrode 12 confronting one another are covered with a layer of boron, so that the gas between these electrodes 11 and 12 will be ionized by the nuclear reaction products released from the boron by the neutrons. The γ-radiation always present in variable strength in the reactor likewise ionizes the chamber gas. This γ-ionization occurs throughout the entire ionization chamber interior, particularly also in the volume between the measuring electrode 11 and the compensation electrode 13 where no neutron reactions occur. Accordingly, the volume between the electrodes 11 and 13 is thus generally termed the γ-volume. The neutron reaction ionizes the gas only in the compartment between the electrodes 11 and 12 where, however, an ionization due to γ-radiation likewise occurs. Thus, the volume between the electrodes 11 and 12 is conventionally termed the (n+γ)-volume.

Between the measuring electrode 11 and a potential reference point 17 (ground) an electric current measuring device 14 is connected. This device generally incorporates an amplifier sensitive enough to measure a directcurrent in the order of magnitude of $10^{-10}$ up to $10^{-4}$ amperes. A first voltage source 15 is connected between the polarization electrode 12 and the potential reference point 17. It delivers a voltage $U_1$ (for example +500 volts). A second voltage source 16 is connected between the compensation electrode 13 and the potential reference point 17 and delivers a compensation voltage $U_2$.

Whereas with the previous known constructions the polarization-voltage sources were direct-current voltage sources, in the present invention the source 16 is an oscillator with the voltage curve $U_2(t)$ as depicted in FIGURE 2. The source 15 may be a direct-current source, but it is of advantage to modulate the direct-current voltage as shown by the curve $U_1(t)$ of FIGURE 2. With a period T, the polarity of the voltage $U_2$ becomes positive during the time interval $\Delta T$ while it is negative during the remaining time interval $T-\Delta T$. The absolute value of the voltage amplitude $\pm U_{20}$ is the same in both cases. The ratio $\Delta T/T$ has to be smaller than 0.5 in order that the average value of the voltage $U_2$ at the compensation electrode 13 is negative. The period T is in the order of magnitude $10^{-2}$ to $10^{-4}$ seconds. It is of advantage to uses an ionization chamber with an $(n+\gamma)$ to $\gamma$-volume ratio manufactured such that $\Delta T/T$ falls into the range of 0.1 to 0.4.

In order to explain the mode of operation there will be initially assumed that the compensation voltage $U_2$ is constant and negative, the polarization voltage $U_1$ likewise constant, however positive. If the chamber gas is ionized then a current $I_1$ flows from the polarization electrode 12 to the measuring electrode 11 and a current $I_2$ flows from the measuring electrode 11 to the compensation electrode 13. The current measuring device 14 will indicate the difference $I_1-I_2$ of both ionization currents. If the ionization chamber 10 is not exposed to any neutron radiation, then the current difference $I_1-I_2$ should be as close to zero as possible, that is $I_1-I_2 \ll I_1$.

The "quality" of the $\gamma$-compensation is defined by $$k \equiv \frac{I_1}{I_1-I_2}$$

In actual practice care was previously taken to keep $I_2$ smaller than $I_1$; otherwise the ionization chamber was said to be "over-compensated."

In accordance with the inventive procedure the ionization chamber is intentionally constructed to be over-compensated in the conventional sense, since the compensation voltage shows the time dependence indicated in FIGURE 2, instead of the previously conventional direct-current voltage. The ionic current $I_2(t)$ according to FIGURE 3 changes its direction with the polarity of $U_2(t)$. Thus the remaining average value $\overline{I_2}$ is essentially given by:

$$\overline{I_2} = I_2\left(1 - 2\frac{\Delta T}{T}\right)$$

The resulting chamber current $I_1-I_2(t)$ has become a pulsating direct-current; its average value with ideal compensation is proportional to the average neutron flux in the chamber.

With each change of polarity of the compensation voltage $U_2$ there occur recombination losses which cannot be prevented. If provision is made that within a time interval $\Delta T$ the new ion balance can appear, then the recombination losses during positive and negative voltage steps have the same size, and they are exactly compensated at the formation of the average value of the current $I_2(t)$ if the voltage curves are the same during positive and negative steps.

If these circumstances are not taken into consideration and if the compensation balance is achieved by means of ion recombination, then the balance is no longer independent of the strength of a $\gamma$-field.

A requirement for the current curve $I_2(t)$ illustrated in FIGURE 3 is that the potential of the measuring electrode 11 with respect to the reference point 17 is always practically zero, that is, it remains small with respect to the amplitude of the voltage $U_2(t)$.

The measuring electrode 11 is often highly resistive connected to the measuring device 14. Due to the capacitance $C_2$ (FIGURE 4) of the condenser formed by the electrodes 11 and 13 the voltage signal $U_2(t)$ is then transmitted to the measuring electrode 11, so that the potential of the measuring electrode 11 substantially follows the voltage curve $U_2(t)$ if no special countermeasures are employed.

The capacitance $C_{S1}$ of the screened lead wire connecting the measuring electrode 11 with the current measuring device 14 already works stabilizing in the desired sense. The still remaining voltage steps, the average value of which exactly disappears, are eliminated by a low-pass filter 18 and thus kept away from the measuring device 14.

The required properties of the filter 18 are the following: High insulation capability and insensitivity to external electromagnetic fields. It is therefore advantageous not to make higher attenuation requirements for the filter than necessary, that is, to take precautions that the voltage signal of the compensation electrode 13 cannot influence the measuring electrode 11. An artificial increase of the lead wire capacitance $C_{S1}$, having an increased stabilization effect, is undesired since thereby the response time for the signal at the measuring electrode 11 caused by the neutrons is likewise increased.

The voltage induction from the compensation electrode 13 on the measuring electrode 11 can be best reduced or compensated by applying to electrode 12 a modulated direct-current voltage $U_1(t)$ as shown in FIGURE 2. If this modulation is performed with a phase exactly opposite to that of the compensation voltage $U_2(t)$ and if the amplitude ratio is made inverse to the ratio of the associated interelectrode capacitances $C_1$ and $C_2$, then no voltage signal is induced on the measuring electrode 12 by the process of reversing the polarity of the compensation voltage $U_2$.

FIGURE 2 illustrates a rectangular wave voltage curve. Actually, a voltage step requires a finite time, as for example shown in FIGURE 6. The expenditure of apparatus for the generation of pulses increases with increasing slope, that is decreasing step duration. It is, therefore, of considerable interest to know which requirements are to be made for the slope of the curve, the course of the step and the step amplitude.

In order to answer these questions there must be initially considered the current-voltage characteristics of an ionization chamber, as for example depicted in FIGURE 5 for the case of constant ionization. With linear increasing polarization voltage U the ionization current I gradually approaches a saturation value $I_s$, which at the voltage $U_{2\ min}$ is approximately attained, for example within 0.1%. If the voltage U continues to increase the current remains constant at the value $I_s$. The current continues to increase only when the voltage exceeds a value $U_{2\ max}$.

If the current losses caused by ion recombination should be negligible, the voltage $U_2$ after completed step must reach at least the value $U_{2\ min}$, that is $|U_{20}| \geqslant |U_{2\ min}|$.

In order to be able to make comments about the course of the voltage steps it is necessary to study the build-up and decay of the space charge.

The current curve $I_2(t)$ depicted in FIGURE 3, in each case exhibits after a completed voltage step a tip and a bulge. The area under this bulge and tip respectively, that is, the integral $$\int_0^\vartheta (I_2(t) - I_{20})\, dt$$

represents space charges; the tips correspond to the electrons; the bulges to the positive ions.

If it is required that the current $\overline{I_2}$ should only be dependent upon the ratio $\Delta T/T$, then the space charges before the positive as well as also before the negative steps have to be the same, that is, the voltage amplitudes $+U_{20}$ and $-U_{20}$ should be of the same size.

If the duration of the step from $-U_{20}$ or $+U_{20}$ to zero is not very small in comparison with the ion travelling time $\vartheta$, then, in addition to amplitude uniformity, a similar course of the steps from the positive or negative amplitude value to the zero crossover is necessary too.

If $|U_2(t)| < |U_{2\ min}|$, then recombination losses occur; these become the larger the slower the voltage range from $+U_{2\ min}$ to $-U_{2\ min}$ or vice versa is covered. In order to compensate current losses similar to voltage step courses are required from $+U_{20}$ to $-U_{2\ min}$ and from $-U_{20}$ to $+U_{2\ min}$.

Figure 6:
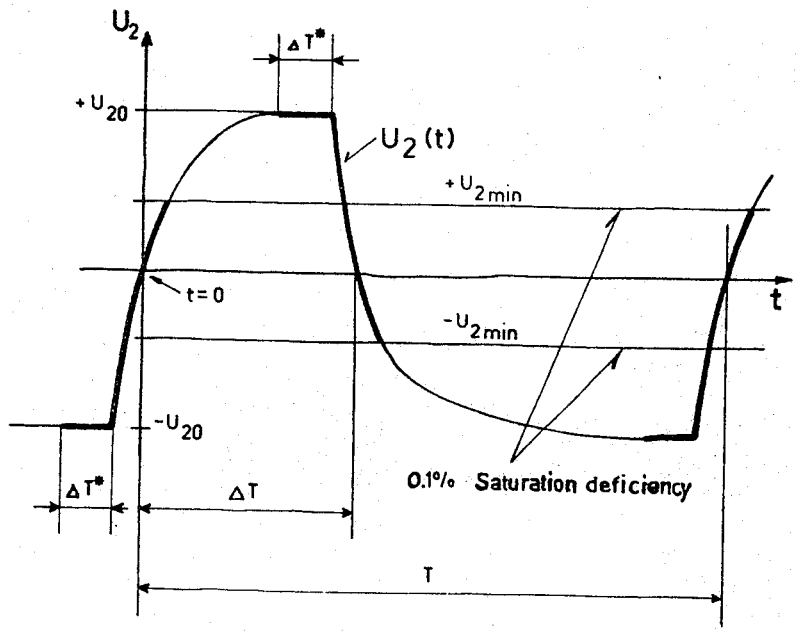
FIGURE 6 graphically depicts a possible voltage curve for the compensation voltage or potential $U_2(t)$.

In FIGURE 6 the previously mentioned critical paths of the compensation voltage curve $U_2(t)$ are depicted by thicker lines. It is clearly to be seen that the thicker full line paths possess the same shape during change of polarity from the negative to the positive amplitude and from the positive to the negative amplitude.

After completed polarity change (zero passage of $U_2(t)$) there begins the decay of the previous space charge distribution and the build-up of the new space charge distribution. The duration of the polarity reversal $\Delta T$ necessary for such reduction can be ascertained from the following requirement:

$$\int_{t=0}^{\Delta T} U_2(t)\,dt \geq \frac{D^2}{\mu}$$

whereby; $t$ represents the time measured from the zero crossover, $D$ the spacing of the electrodes 11 and 13, $\mu$ the ionic mobility.

Pictorially, this requirement means that the hatched area shown in FIGURE 2 should be $$\geq \frac{D^2}{\mu}$$

For the build-up of the new space charge equilibrium, it is necessary that from the moment the amplitude $+U_{20}$ or $-U_{20}$ is reached a certain interval of time, $$\Delta T^* \geq \vartheta = \frac{D^2}{\mu U_2}$$

elapses before $U_2(t)$ again reverses (cf. FIGURE 6). This second requirement follows from the first if $U_2(t)$ is replaced by $U_{20}$.

Generally, it is of interest to maintain $\Delta T$ small in order that the pulse frequency $1/T$ can be chosen as large as possible. The optimum ratio $\Delta T/T$ is at 16.7% for a parallel plate chamber, which corresponds to a volume ratio of the $\gamma$ to the $(n+\gamma)$ section of 1.5. The mentioned volume ratio should lie in the range of 1.3 to 2 for a parallel plate chamber or quasi-parallel plate chamber.

The foregoing detailed description has been given for clearness or understanding only, and no unnecessary limitations should be understood therefrom, as modifications will be obvious to those skilled in the art.

What is claimed is:

1. Method for the $\gamma$-compensation of an ionization chamber having at least one measuring electrode and at least two polarization electrodes, one of which serves as compensation electrode, while utilizing a current measuring device coupled to the measuring electrode and two voltage sources, which on the one hand are connected to the polarization electrodes and on the other hand to the current measuring device, wherein the voltage source connected with the compensation electrode delivers a polarization potential designated as compensation potential; comprising the steps of: periodically reversing during a time interval ($\Delta T$) the polarity of the compensation potential ($U_2$) at an ionization chamber intentionally made overcompensated in the conventional sense, so that a fraction of the compensation current of the ionization chamber can be returned to the measuring electrode, and regulating the $\gamma$-compensation by adjusting the ratio ($\Delta T/T$) of the time interval ($\Delta T$) of each reversal to the period ($T$) of successive reversals.

2. Method as defined in claim 1 including the step of maintaining the compensation potential ($U_2$) at a constant value ($\pm U_{20}$) before each change in polarity for a certain interval of time ($\Delta T^*$) which is at least equal to the ion travelling time ($\vartheta$) at that voltage $U_{20}$.

3. Method as defined in claim 1 including the step of applying a compensation potential exhibiting a voltage curve which, except for its sign, has the same course during all reversals from the beginning of the voltage step past the zero value at least until reaching approximately the saturation voltage ($U_{2\ min}$), if the time needed for the polarity reversals is longer or of the same magnitude as the ion travelling time ($\vartheta$) at the amplitude value ($U_{20}$) of the compensation potential.

4. Method as defined in claim 1 wherein the potential ($U_1$) of the polarization electrode of the $(n+\gamma)$-volume is pulsed in opposite phase to the compensation potential ($U_2(t)$) without changing polarity.

5. Method as defined in claim 1 including the step of choosing the period ($T$) of the successive polarity reversals of the compensation potential ($U_2$) between $10^{-2}$ and $10^{-4}$ seconds.

6. Method for the $\gamma$-compensation of an ionization chamber having at least one measuring electrode and at least two polarization electrodes, one of which serves as compensation electrode, while utilizing a current measuring device coupled to the measuring electrode and two voltage sources, one of which is connected to the compensation electrode and the measuring device and the other to the remaining polarization electrode and the measuring electrode, wherein the voltage source connected to the compensation electrode delivers a polarization potential designated as compensation potential; comprising the steps of: maintaining the same polarity of the potential applied to said remaining polarization electrode throughout $\gamma$-compensation, periodically reversing during a time interval ($\Delta T$) the polarity of the compensation potential ($U_2$) at an ionization chamber intentionally designed overcompensated in the conventional sense, so that a fraction of the compensation current of the ionization chamber can be returned to the measuring electrode, and regulating the $\gamma$-compensation by adjusting the ratio ($\Delta T/T$) of the time interval ($\Delta T$) of each reversal to the period ($T$) of successive reversals.

References Cited

UNITED STATES PATENTS

| | | | |
|---|---|---|---|
| 2,440,167 | 4/1948 | Broxton et al. | 250—83.1 |
| 2,498,461 | 2/1950 | Skellett | 250—83.3 |
| 2,986,636 | 5/1961 | Carlson et al. | 250—83.6 |

RALPH G. NILSON, *Primary Examiner.*

WALTER STOLWEIN, *Examiner.*

S. ELBAUM, *Assistant Examiner.*